Patented Jan. 14, 1936

2,028,072

UNITED STATES PATENT OFFICE 2,028,072

PROCESS FOR PRESERVING MILK

Georg Alexander Krause, Munich, Germany, assignor to Katadyn, Inc., Dover, Del., a corporation of Delaware No Drawing. Application February 24, 1931, Serial No. 518,039. In Germany February 24, 1930

6 Claims. (Cl. 99—15)

This invention relates to a process for preserving milk.

As is known, liquids can be sterilized and consequently preserved by bringing them into contact with oligodynamically active substances such as metallic silver, copper or alloys of these metals. The usual condition for successful sterilization is to keep the metal in contact with the liquid until all the germs have been killed, the period of contact being dependent upon the nature of the liquid to be treated and upon the number of germs present therein.

A very important problem which presents itself is the preserving of milk. As is known, milk is an ideal nutritive base for the most diverse kinds of germs. Almost every kind of milk possesses, directly after the milking, a very large number of germs which may vary between several thousand and several million per cubic centimetre of the milk. If the milk be not subjected to any further treatment this germ content very rapidly rises to gigantic proportions.

When milk is to be sterilized by oligodynamic means it must be left in contact with the oligodynamic material for several hours. Experiments which were carried out with silver, which is the most effective oligodynamic metal, have established that milk on being left in contact with the metal for such long periods develops a nauseating bitter taste and becomes grey in colour.

It has now been found that the above described undesirable alteration of the milk can be avoided by using very short periods of contact between the milk and the oligodynamic substances such as for example periods of 1 to 10 minutes and that moreover this short oligodynamic action is already sufficient to bring about a considerable preserving effect, which is quite unexpected. The milk is in this case usually not completely sterilized, but the original germ content is very considerably reduced and on standing, it usually sinks much further, and ultimately either remains stationary or very gradually rises again.

This latter increase occurs however in such a manner that the germ content of the treated milk is always considerably below the germ content of the same milk which has not been oligodynamically treated. It also appears that the acid forming bacteria of milk are in particular attenuated by the short oligodynamic treatment. Thus, the practical effect of this treatment is that treated milk will only go sour several hours or days later than untreated milk under the same conditions.

Example 1

Milk is caused to flow down through a bed of silvered clay pellets, the silvering being carried out by immersing the pellets in silver nitrate solution and subsequently igniting them.

| | |
|---|---:|
| Germ content of the untreated milk, millions per cu. cm | 1.16 |
| Period of oligodynamic treatment of the milk _____ minute | 1 |
| Temperature at which the milk is treated and stored _____ ° C | 20 |
| The germ content of the milk amounted directly after the oligodynamic treatment to _____ millions per cu. cm | 1.16 |
| After 2 hours _____ millions per cu. cm | 0.98 |
| After 6 hours _____ millions per cu. cm | 2.11 |
| After 24 hours _____ millions per cu. cm | 6.50 |
| After 38 hours _____ millions per cu. cm | 30.00 |

Even after 48 hours the milk still possesses a fresh taste. After 72 hours it had gone sour and it only curdled after 96 hours.

For a control experiment another quantity of the same milk was kept at the same temperature without preliminary treatment. This control milk showed the following germ numbers.

| | |
|---|---:|
| At the beginning _____ millions per cu. cm | 1.14 |
| After 2 hours _____ millions per cu. cm | 3.65 |
| After 6 hours _____ millions per cu. cm | 8.67 |
| After 24 hours _____ millions per cu. cm | 300.00 |

The control milk went sour already after 24 hours; after 48 hours it had curdled and had a very unpleasant taste and smell.

If the treated and the untreated milk be kept at 30° C. instead of 20° C., then naturally the sour taste and the curdling will take place earlier than under the conditions above stated, but even at 30° C. the same considerable difference exists between the treated and the untreated milk.

The advantages of the process for preserving the milk according to the present invention in contradistinction to the heat treatment hitherto employed are obvious. The raw milk suffers no alteration in respect of its favourable properties, taste and smell, no skin of calcium caseinate is formed and the vitamins are conserved.

It has moreover been ascertained that the process of the present invention can advantageously be combined with any of the ordinary heat treatment processes for pasteurizing milk. The ordinary heat treatment, that is to say, heating milk up to about 63 or 83° C. for a period of 30 minutes at least, as is known has very definite disadvantages. Thus the taste and smell of the milk are altered, as are the composition and the content of vitamins. It has now been ascertained that a very excellent preserving effect can be obtained by merely heating the milk for a much shorter period than was hitherto customary and in addition carrying out a short oligodynamic treatment. The disadvantages of the ordinary heat treatment are thus avoided to a very great extent or are very considerably obviated and the preserving effect exceeds the effect obtained by the ordinary pasteurizing. In this case the heating can take place before, during or after the oligodynamic treatment. As in the case of the ordinary heat treatment, also in this case strong cooling after the heating and allowing the milk to stand at a low temperature has a favourable effect.

*Example 2*

The milk is subjected to oligodynamic treatment and is thereupon heated for a short time.

Germ content of the untreated milk_____ 640.000 per cu. cm.

Period during which the milk is subjected to oligodynamic treatment _____ 1, 2, 3 or 4 minutes Period of heating after the oligodynamic treatment ___ 10 minutes at 63° C.

Temperature at which the milk is stored_____ 20° C.

The following table gives the results of the germ content of various test portions of milk after being stored for various periods. The control test portion was heated as was the case with the other test portions, but was not subjected to oligodynamic treatment.

*Germ numbers per cu. cm.*

| Period of contact of the test portions of milk | Germ numbers immediately after heating | ½ hour later | 1½ hours later | 14 hours later | 6 days later |
|---|---|---|---|---|---|
| 1 minute | 6000 | 1030 | 1300 | 5100 | 2700 |
| 2 minutes | 4800 | 2500 | 2600 | 2000 | 2100 |
| 3 minutes | 2200 | 2000 | 2000 | 2000 | 1540 |
| 4 minutes | 2100 | 2500 | 2000 | 1500 | 1240 |
| Control | 7600 | 9200 | 11500 | 700000 | 3000000 curdled |

From the table the following conclusions are drawn: By mere heating the germ content of the milk is already reduced from 640,000 to about 7,600; in the test portions treated oligodynamically it is still further reduced, that is to say, from 6,000 to 2,100. Whilst however the germ content in milk which has merely been heated rapidly increases, that is to say, after 1½ hours it is already 11,500 and after 14 hours it is even as great as 700,000; with oligodynamically treated and heated test portions the germ content remains at about the original amount with small variations or even sinks below that amount. The control-test portion had curdled after 6 days with a germ content of 3,000,000, the other test portions only curdled 3 days, and in some cases 4 days later.

*Example 3*

The milk was heater for a short time and thereupon treated oligodynamically.

The germ content of the untreated milk was_____ 185,500 per cu. cm.

The milk was heated prior to the oligodynamic treatment for _____ 5 minutes.

The period of oligodynamic contact treatment of the milk was_____ 18 seconds.

The temperature of storing was _____ 20° C.

The following table gives the result of the increase of the germ content, the alteration in flavour and the increase in acidity of milk thus treated in contradistinction to a control test portion which was subjected to the identical heat treatment but without oligodynamic treatment.

| Time | Germ numbers | | Flavour and smell | | Acidity | |
|---|---|---|---|---|---|---|
| | Catadyn | Control | Catadyn | Control | Catadyn | Control |
| | | | | | *Percent* | *Percent* |
| After 1 day | 3500 | 10,000 | Sweet | Sweet | 0.15 | 0.15 |
| 2 days | <10000 | 2.5 millions | Sweet | Sweet | 0.15 | 0.15 |
| 3 days | <10000 | 62.5 millions | Sweet | Sweet | 0.15 | 0.165 |
| 4 days | <10000 | 290 millions | Sweet | Cheesy rancid, very bitter smell | | 0.185 |
| 5 days | <10000 | No longer countable | Sweet | Lumpy, clotted curdled | 0.15 | 0.71 |
| 6 days | <10000 | | Sweet | Bitter, stinking, very impure | 0.15 | |
| 7 days | <10000 | | Sweet | | 0.1525 | |
| 8 days | <10000 | | Sweet | | 0.15 | |
| 9 days | <10000 | | Sweet | | 0.15 | |
| 11 days | <10000 | | Sweet | | 0.16 | |
| 14 days | <10000 | | Sweet | | 0.16 | |

It can be seen from the above table that the germ content of "catadyn" milk i. e. milk oligodynamically treated remains under 10000 up to 14 days, whilst the control test contains 290 million germs even on the fourth day. At this period the control milk possesses a rancid smell resembling cheese and it has a very bitter taste and is therefore quite unpalatable. On the fifth day it had curdled into small lumps, it stank and was extremely impure. The acidity at this period was 0.71%.

The catadyn milk still had a sweet taste after 14 days and still showed no tendency to curdle since its degree of acidity was only 0.16%.

As can be seen from the examples, a considerable preserving effect can already be produced by a very short oligodynamic treatment of the milk alone, without said milk deteriorating with respect to its flavour, smell and appearance. This favourable effect is however considerably intensified when the milk is also heated, this heating being confined to such a short period that the deterioration of the milk which usually takes place during pasteurization does not take place.

It appears to be particularly advantageous to carry out the heating of the milk prior to the oligodynamic treatment.

It is obvious that the hereinbefore described process can be combined with any other precaution, which is adapted to keep the milk fresh. Thus, for example, the milk which has been treated according to the process of the present invention can be immediately strongly cooled, and if desired be stored in a refrigerator.

I claim:

1. The process for preserving milk without alteration of flavor, smell, or color which comprises the step of heating the milk to a temperature less than the boiling point and for a period insufficient to materially decrease the vitamin content or form skin thereon, and subsequently treating said previously heated milk to an intimate contact with oligodynamically active substances, the contact between the milk and oligodynamically active substances being interrupted before the milk undergoes any alteration with respect to flavor, smell or color.

2. A process for treating milk for human consumption to permit longer storage thereof while retaining its potable qualities which comprises the partial sterilization of the milk by contact treatment with oligodynamically active bodies while in a previously heated condition, the heating being shorter than conventional pasteurization and insufficient to cause complete sterilization or to impart a boiled taste to the milk, the oligodynamic treatment being interrupted after less than four minutes so as to impart no change of color or taste to the milk, said milk when so treated having substantially the full vitamin value of untreated milk and rendered potable for from two to three times as long as untreated milk and coagulating only after at least a day after coagulation of untreated milk.

3. The process of treating milk to reduce the rate of growth of the bacteria therein which comprises the steps of simultaneously heating the milk to a temperature of approximately 63° C. for a period less than ten minutes, subjecting the milk during a portion of this time to oligodynamic treatment and subsequently storing the milk at a temperature below 30° C.

4. The process for preserving milk for human consumption to permit longer storage thereof while retaining its potable qualities which comprises the partial oligodynamic sterilization of the milk by contact treatment with an oligodynamically active metal for a period of time insufficient to bring about complete sterilization said treatment being interrupted before the milk undergoes any alteration with respect to flavor, smell or color, and simultaneously heating the milk at a temperature substantially below the boiling point said heating being shorter than conventional pasteurization, and insufficient to cause complete sterilization or to impart a boiled taste to the milk and ineffective to alter the natural vitamin content of the milk.

5. The process for preserving milk which comprises the step of oligodynamically treating the milk during a period of time not greater than five minutes of contact, interrupting this period before the milk undergoes any change of flavor, smell or color, and heating the milk after the oligodynamic treatment during a period of time in the range of ten minutes to a temperature less than the boiling point.

6. The process for preserving milk and reducing the rate of growth of the bacteria content, which comprises the step of intimately contacting the milk with oligodynamicallly active substances, interrupting the period of contact after a period of a few seconds up to about five minutes and before the milk undergoes any change of flavor, smell or color, and subsequently heating the milk without boiling during a period in the range of ten minutes, and finally rapidly cooling the milk after treatment and before storage in a cool place.

GEORG ALEXANDER KRAUSE.